(12) United States Patent
Wackerly

(10) Patent No.: US 10,135,670 B2
(45) Date of Patent: Nov. 20, 2018

(54) RESPONSE TO AN INOPERATIVE NETWORK DEVICE MANAGED BY A CONTROLLER

(71) Applicant: HEWLETT PACKARD ENTERPRISE DEVELOPMENT LP, Houston, TX (US)

(72) Inventor: Shaun Wackerly, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 33 days.

(21) Appl. No.: 15/504,277

(22) PCT Filed: Dec. 22, 2014

(86) PCT No.: PCT/US2014/071799
§ 371 (c)(1),
(2) Date: Feb. 15, 2017

(87) PCT Pub. No.: WO2016/105330
PCT Pub. Date: Jun. 30, 2016

(65) Prior Publication Data
US 2017/0237604 A1   Aug. 17, 2017

(51) Int. Cl.
*H04L 12/24* (2006.01)
*H04L 12/28* (2006.01)
(Continued)

(52) U.S. Cl.
CPC .......... *H04L 41/0672* (2013.01); *H04L 12/28* (2013.01); *H04L 41/0654* (2013.01); *H04L 41/0659* (2013.01); *H04L 41/0816* (2013.01); *H04L 43/0811* (2013.01); *H04L 43/10* (2013.01); *H04L 45/02* (2013.01);
(Continued)

(58) Field of Classification Search
CPC ....... H04L 12/24; H04L 12/707; H04L 12/26; H04L 12/751; H04L 45/28
See application file for complete search history.

(56) References Cited

U.S. PATENT DOCUMENTS 6,862,263 B1   3/2005   Simmons
7,986,618 B2   7/2011   Charny et al.
(Continued)

FOREIGN PATENT DOCUMENTS

CN          103795805 A      5/2014
WO     WO-2014114119 A1     7/2014

OTHER PUBLICATIONS

"Compactlogix and Programmable Controllers," 2014, pp. 1-2, ODVA, Inc.
(Continued)

*Primary Examiner* — Chi Ho A Lee
(74) *Attorney, Agent, or Firm* — Hewlett Packard Enterprise Patent Department

(57) ABSTRACT

In an example, a computer-readable medium may store executable instructions. The executable instructions may be to detect an inoperative network device in a communication network managed by a controller, determine a network switching function assigned to the inoperative network device, and provide the network switching function through the controller itself instead of the inoperative network device.

11 Claims, 9 Drawing Sheets

(51) Int. Cl.
    *H04L 12/26*   (2006.01)
    *H04L 12/751*  (2013.01)
    *H04L 12/707*  (2013.01)
    *H04L 12/703*  (2013.01)

(52) U.S. Cl.
    CPC .............. *H04L 45/22* (2013.01); *H04L 41/04* (2013.01); *H04L 45/28* (2013.01)

(56) References Cited

U.S. PATENT DOCUMENTS

| | | | |
|---|---|---|---|
| 2010/0165916 A1 | 7/2010 | Duan et al. | |
| 2011/0286324 A1* | 11/2011 | Bellagamba | H04L 41/0677 370/219 |
| 2012/0201140 A1 | 8/2012 | Suzuki et al. | |
| 2012/0287787 A1* | 11/2012 | Kamble | H04L 49/70 370/235 |
| 2013/0064102 A1* | 3/2013 | Chang | H04L 49/70 370/244 |
| 2013/0195110 A1 | 8/2013 | Kojima | |
| 2013/0215769 A1 | 8/2013 | Beheshti-Zavareh et al. | |
| 2015/0099865 A1* | 4/2015 | Chiarello | C07C 319/20 530/391.9 |
| 2015/0117175 A1* | 4/2015 | Dharmadhikari | H04L 41/0659 370/216 |
| 2015/0215156 A1* | 7/2015 | Yoon | H04L 45/64 370/225 |
| 2016/0073278 A1* | 3/2016 | Roessler | H04L 49/70 370/252 |
| 2016/0119255 A1* | 4/2016 | Luo | H04L 49/557 370/218 |
| 2016/0119821 A1* | 4/2016 | Ramachandran | H04L 45/28 370/392 |
| 2016/0164739 A1* | 6/2016 | Skalecki | H04L 41/0896 370/389 |
| 2017/0171039 A1* | 6/2017 | Su | H04L 43/04 |

OTHER PUBLICATIONS

Ethan Banks, "SDN Showdown: Examining the differences between VMware's NSX and Cisco's ACI," Jan. 6, 2014, pp. 1-12, Network World, Inc.

International Search Report and Written Opinion, International Application No. PCT/US2014/071799, dated Sep. 22, 2015, pp. 1-11, KIPO.

* cited by examiner

RESPONSE TO AN INOPERATIVE NETWORK DEVICE MANAGED BY A CONTROLLER

BACKGROUND

High speed communication networks form part of the backbone of what has become indispensable worldwide data connectivity. Within the data networks, network devices such as switching devices direct network traffic from source ports to destination ports, helping to eventually guide the data packets from a source to a destination. Improvements in the resiliency and efficiency of these communication networks will increase the effectiveness of communicating data.

BRIEF DESCRIPTION OF THE DRAWINGS

Certain examples are described in the following detailed description and in reference to the drawings.

DETAILED DESCRIPTION

The disclosure below describes a network controller that may provide redundant network operations for an inoperative network device. By providing the redundant network operation itself, the controller may reduce or eliminate the need for additional redundant hardware in a communication network. Accordingly, the controller-based redundancy described herein may result in lowered network implementation costs and decreased management complexity. Moreover, the controller may provide network redundancy for an inoperative network device in a seamless and efficient manner so as to reduce the overall impact on end-users. In some cases, the end users of a communication network may experience little or no performance degradation through the controller provided redundancy described herein.

Figure 1:
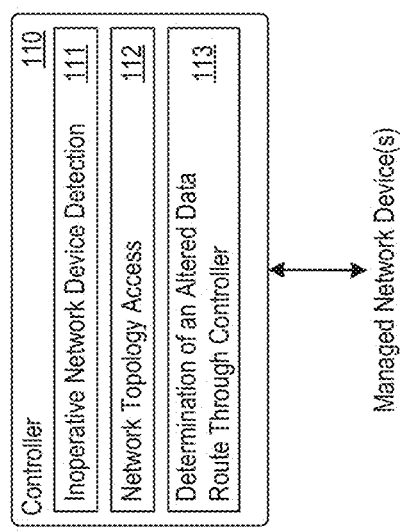
FIG. 1 shows an example of a controller that provides a redundant network operation.

FIG. 1 shows an example of a controller 110 that provides a redundant network operation. The controller 110 may be a logical entity that manages one or more network devices in a communication network. Accordingly, the controller 110 may be implemented as hardware, software, or a combination of both. The controller 110 may include any number of devices, systems, logic, or circuitry to implement any of the features described herein.

The controller 110 may manage network devices that route data in the communication network. As the network devices may form the communication network, the controller 110 may thus manage a communication network that formed by the managed network devices. Examples of network devices the controller 110 may manage include routers, switches, hubs, gateways, switching fabrics, or any other device (physical or virtual) that forwards packet data between a source and destination. In managing the network devices, the controller 110 may identify and inventory network devices, determine device capabilities and bandwidth, implement data routing rules, gather network statistics, perform network analytics, and more. The controller 110 may maintain a global view of a managed network of communication devices, which may include maintaining a network topology of the communication network. The network topology may track network devices in the communication network and communication links between the network devices. The network topology may for specify data routes in the communication network, which the controller 110 may assign for particular network flows for example.

In some examples, the controller 110 implements a software defined networking (SDN) controller. The controller 110 may thus be physically separate from the network devices managed by the controller 110, decoupling the system that makes decisions about where network traffic is sent (which may be referred to as a control plane) from the underlying systems that forward then the network traffic to the selected destination (which may be referred to as a data plane). The controller 110 may control how data traverses across the data plane, for example by determining and assigning data routes in the communication network for traffic flows and configuring the managed network devices to route a particular traffic flow according to a determined data route. The controller 110 may thus assign network switching functions to a managed network device, which may include routing data across a particular data route.

As described in greater detail below, the controller 110 may provide a redundant network operation for an inoperative network device. In particular, the controller 110 may detect an inoperative network device among the network devices managed by the controller 110. In response, the controller 110 determine a network function assigned to the inoperative network device, and itself provide the network function instead of the inoperative network device. The network function may include a network switching function, such as routing data along a particular data route in the communication network.

In the specific example shown in FIG. 1, the controller 110 includes functionality that supports inoperative network device detection 111, network topology access 112, and determination of an altered data route through the controller 113. The functionalities 111, 112, and 113 may allow the controller 110 to detect an inoperative network device in a communication network managed by the controller 110, and in response: access a network topology to identify a data route that includes the inoperative network device, determine an altered data route that routes data through the controller 110 itself instead of the inoperative network device, and implement the altered data route by instructing an adjacent network device (or set of adjacent network devices) previous to the inoperative network device in the data route to transmit data for the data route to the controller 110 instead of the inoperative network device.

Figure 2:
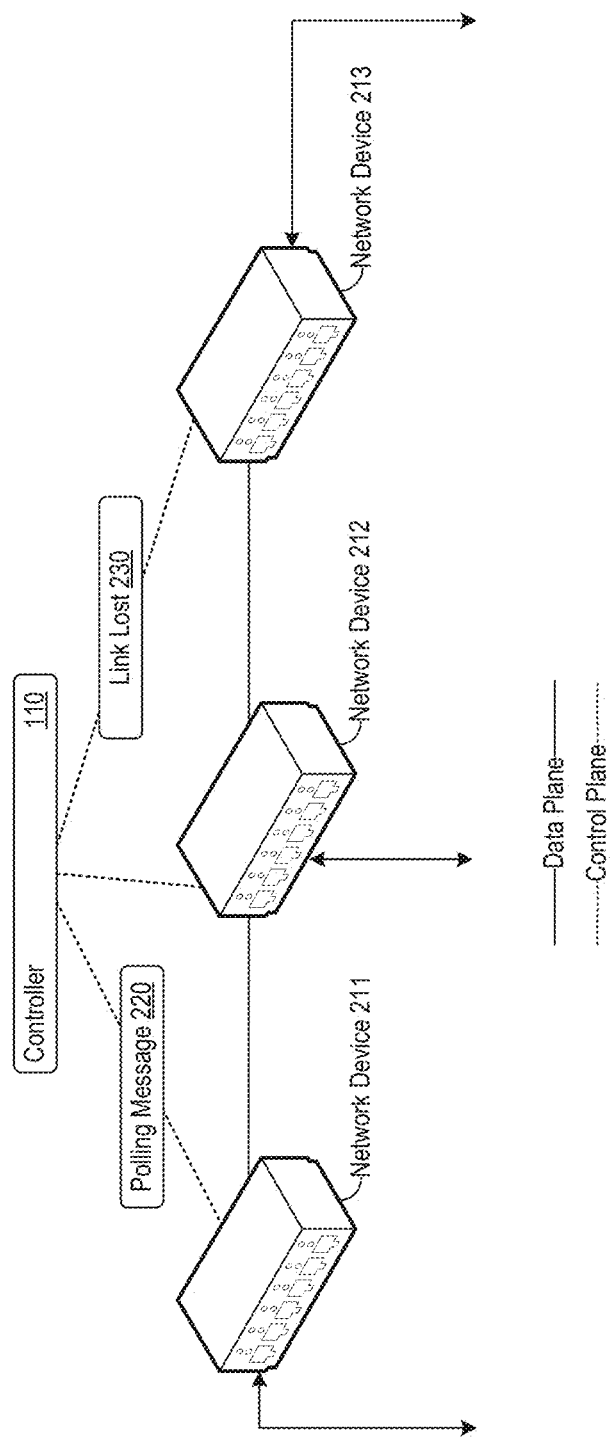
FIG. 2 shows an example of a communication network that the controller may manage.

FIG. 2 shows an example of a communication network the controller 110 may manage. In FIG. 2, the controller 110 manages a communication network that includes the network devices labeled as 211, 212, and 213. The network devices 211, 212, and 213 may be communicatively linked to other devices outside of this communication network managed by the controller 110, for instance to an end point device (e.g., an application server or a consumer device) or an edge device of another communication network. In the communication network shown in FIG. 2, the network devices 211, 212, and 213 are serially linked where the network device 211 is directly linked to the network device 212 and the network device 212 is directly linked to the network device 213. The network devices 211, 212, and 213 may route network traffic (e.g., packet data) across a data plane and according to data routes configured by the controller 110. In FIG. 2, communication links across the data plane are shown in non-dotted lines.

The controller 110 may be communicatively linked to the network devices 211, 212, and 213. In some examples, the controller 110 is linked to network devices through a control plane connection, which may refer to any connection or link through which control plane packets are exchanged. In FIG. 2, the control plane connections between the controller 110 and the network devices 211, 212, and 213 respectively are shown in dotted lines. The controller 110 may configure network devices by sending control packets across a control plane connection. The network devices 211, 212, and 213 may transmit control data to the controller 110 through the control plane connections, which may specify device capabilities, bandwidth, network traffic patterns, acknowledgements to control instructions, status data for the network device, etc.

The control plane connection between the controller 110 and a network device may include any number of specific characteristics. The controller 110 may employ a particular communication channel, packet encapsulation technique, communication protocol, or any other requirement for communications across a control plane connection. In some examples, the controller 110 and managed network devices support the OpenFlow protocol and exchange control plane communications according to the OpenFlow protocol. However, any other SDN protocol may be supported by the controller 110 and managed network devices.

The controller 110 may detect an inoperative network device in the managed communication network e.g., among the network devices 211, 212, and 213 managed by the controller 110. The controller 110 may identify a network device as inoperative when the network devices loses a network function, such as routing of data plane packets or responding to control plane packets. The controller 110 may identify an inoperative network device as a result of, for example, the network device experiencing a hardware failure, powering down, device reset, disabling of network connectivity, or based on any other planned or unplanned effect on the functionality of the network device. As another feature, the controller 110 may identify a network device as inoperative even when the network device is electronically operational, but loses the ability to provide a network function. Such scenarios may occur when the network device is caught in a deadlock (e.g., through a looped central processing unit (CPU)), when CPU utilization exceeds an operational threshold such that the network device is incapable of providing the network function, or any other situation where the load on the CPU (or any other circuitry of the network device) prevents the network device from providing the networking function.

The controller 110 may detect an inoperative network device in various ways, examples of which are presented next. In some implementations, the controller 110 identifies a scheduled time when the network device will become inoperative, such as when the controller 110 or other management entity performs a hardware or software reset or other maintenance on the network device, during which the network device will be inoperative. The controller 110 may thus identify an inoperative network device even before a particular network device ceases to provide network functionality.

In some implementations, the controller 110 transmits a polling message 220 to a network device, which may instruct the network device to provide a response to the polling message 220. The controller 110 may identify a network device as inoperative when the network device fails to respond to the polling message 220. In some examples, the controller 110 employs a response time limit by which the network device should respond to a polling message 220. The controller 110 may specify the response time limit from when the polling message 220 is transmitted by the controller 110 or when the polling message 220 is received by the network device. When the network device does not respond within the response time limit, the controller 110 may determine that the network device is inoperative.

In some implementations, the controller 110 detects an inoperative network device by receiving a link lost message 230 from another network device linked to the inoperative network device. To illustrate, the network device 212 may experience a hardware failure that disrupts a communication link to the network device 213. In response, the network device 213 may transmit a link lost message 230 to the controller 110 indicating the network device 213 has lost a communication link with the network device 212. By receiving the link lost message 230, the controller 110 may determine that the network device 212 as inoperative. As one variation, the controller 110 may determine a particular network device as inoperative upon receiving a threshold number of link lost messages 230 for the particular network device, e.g., from some or all of other network devices linked to the particular network device.

In some implementations, the controller 110 detects an inoperative network device through lack of a periodic update message sent from a managed network device. The controller 110 may configure the network devices to send a check-in message at a periodic rate and determine a particular network device as operative when the controller 110 fails to receive one or more check-in messages from the particular network device (e.g., after failing to receive a threshold number of check-in messages). As yet another example, the controller 110 may monitor network traffic from a managed network device to identify errors or a ceased flow of packet data in order to detect an inoperative network device.

The controller 110 may detect an inoperative network device using any of the example techniques described above. Moreover, the controller 110 may apply any number of inoperative network device detection techniques in combination, and the respective techniques discussed above may be just one of multiple inoperative device criterion applied by the controller 110. The controller 110 may detect an inoperative network device when multiple inoperative device criteria are met, and as one particular example when both of the following criterion are met: (i) receiving a threshold number of link lost messages 230 for a particular network device and (ii) failing to receive a response to a polling message 220 within a response time limit from the particular network device.

Upon detecting an inoperative network device, the controller 110 may provide a network switching function assigned to the inoperative network device. The controller 110 may thus provide a redundant network function through itself, without having to allocate additional hardware, circuitry, or processing resources in the communication network to provide the network function in place of the inoperative network device. One network switching function the controller 110 may provide is routing network traffic across a particular data route handled by a network device the controller 110 has detected as inoperative. The controller 110 may determine an altered data route that passes through the controller 110 itself instead of an inoperative network device, thus maintaining connectivity through the data route even if a network device in the data route becomes inoperative. In that regard, the controller 110 may maintain connectivity between two end hosts across the communication network by way of the altered data route, which was previously linked by way of the data route with the inoperative network device.

Figure 3A:
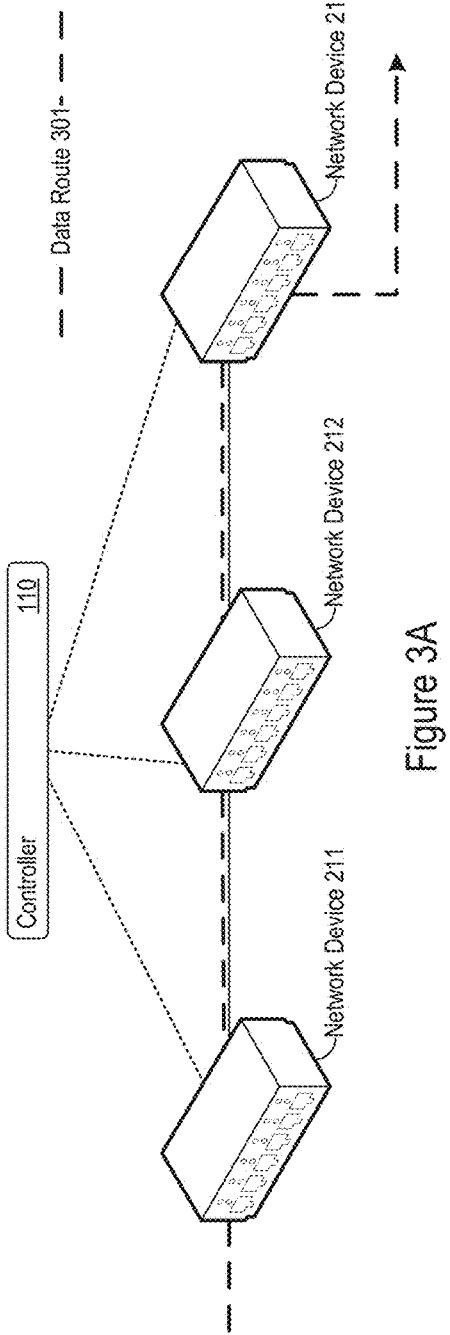
FIG. 3A shows an example of a data route in a communication network managed by the controller.

FIG. 3A shows an example of a data route 301 in a communication network managed by the controller 110. The communication network in FIG. 3 includes the network devices 211, 212, and 213, which are serially linked. The controller 110 may configure the data route 301 to traverse from the network device 211 to the network device 212 to the network device 213. In doing so, the controller 110 may transmit respective configuration instructions to the network devices 211, 212, and 213 which may control the respective routing tables of the network devices 211, 212, and 213 to implement the data route 301. The data route 301 may be associated with a particular traffic flow (e.g., a sequence of packets sent from a particular source to a particular destination). The data route 301 may be tracked as part of the network topology that the controller 110 may maintain.

Figure 3B:
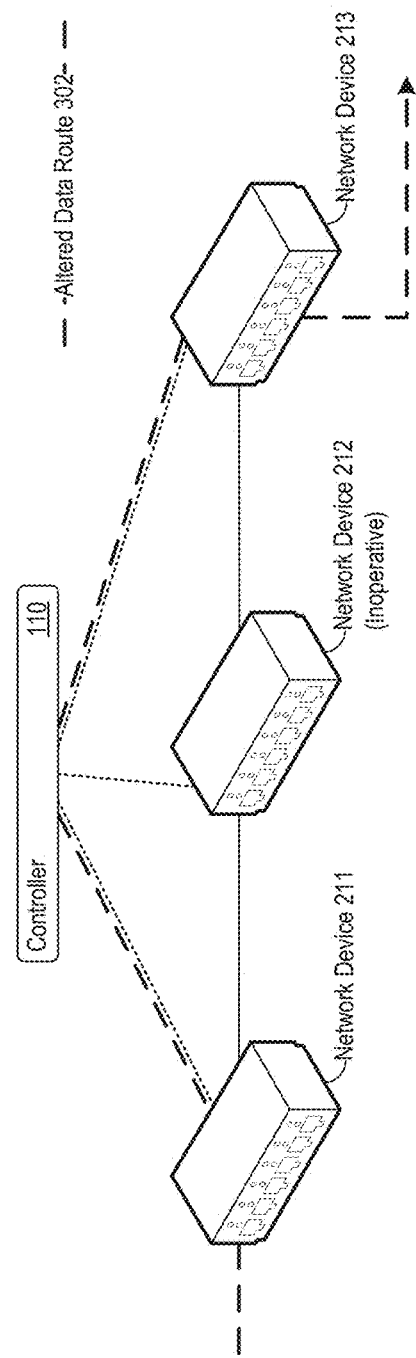
FIG. 3B shows an example of an altered data route that the controller may determine.

FIG. 3B shows an example of an altered data route 302 that the controller 110 may determine. In the example shown in FIG. 3B, the controller 110 may determine the altered data route 302 by altering the data route 301 to include the controller 110 instead of an inoperative network device.

The controller 110 may detect that a managed network device has become inoperative. In the example shown in FIG. 3B, the controller 110 identifies the network device 212 as inoperative. In response, the controller 110 may access the network topology and identify one or more impacted data routes affected by the inoperative network device. Thus, in the example shown in FIG. 3B, the controller 110 determines that the data route 301 is impacted by the inoperative network device 212. The data route 301 may be severed when the network device 212 becomes inoperative, blocking data communication along the data route 301 and causing a communication outage. The controller 110 may alter the data route 301 to traverse through the controller 110 itself to maintain communications for the data route 301 even when the network device 212 is inoperative.

To determine altered data route 302, the controller 110 may identify one or more network devices adjacent to an inoperative network device in an impacted data route, such as the impacted data route 301 in the example shown in FIG. 3A. In that regard, the controller 110 may determine an adjacent network device that transmits packet data to the inoperative network device in the impacted data route, which may also be referred to as previous hop or previous node to the inoperative network device in the impacted data route. The controller 110 may also determine an adjacent network device that receives packet data from the inoperative network device in the impacted data route, which may also be referred to as a next hop or next node for the inoperative network device in the impacted data route. In the example shown in FIGS. 3A and 3B, the controller 110 identifies the network devices 211 (prior) and 213 (next) as adjacent network devices to the inoperative network device 212 in the impacted data route 301.

The controller 110 may determine the altered data route 302 by replacing the inoperative network device 212 in the impacted data route 301 with the controller 110 itself. The controller 110 may implement the altered data route 302 by instructing an adjacent network device prior to the inoperative network device in the impacted data route (e.g., the network device 211 prior to inoperative network device 212) to route packet data to the controller 110 instead of the inoperative network device. As part of implementing the altered data route 302, the controller 110 may configure the adjacent network device 211 by sending a configuration instruction causing the network device 211 to alter a next hop destination for the data route 301 to the controller 110 instead of the inoperative network device 212. The controller 110 may further implement the altered data route 302 by routing packet data received from the network device 211 to the next hop destination in the altered data route 302, e.g., the network device 213. The controller 110 may thus provide a network switching function in place of an inoperative network device.

The controller 110 may implement portions of the altered data route 302 to utilize a control plane connection, including communications between a prior hop and a next hop for the controller 110. The altered data route 302 may thus include one or more communication links across the data plane as well as one or more communication links across the control plane communication. In replacing the inoperative network device, the controller 110 may instruct adjacent network devices in an impacted data route to communicate with the controller 110 utilizing a control plane connection. The controller 110 may thus instruct an adjacent network device prior to the controller 110 in the altered data route 302 to use a particular control channel or communication tunnel, perform a particular packet encapsulation process, or process packet data according to any control protocol when transmitting packet data along the altered data route 302 to the controller 110. The controller 110 may likewise instruct an adjacent network device subsequent to the controller 110 in the altered data route 302 to receive packet data through a particular control channel or according to a particular control protocol or packet decapsulation technique. Indeed, the controller 110 may employ any control plane communication protocols in receiving and transmitting network traffic along the altered data route 302.

Figure 4A:
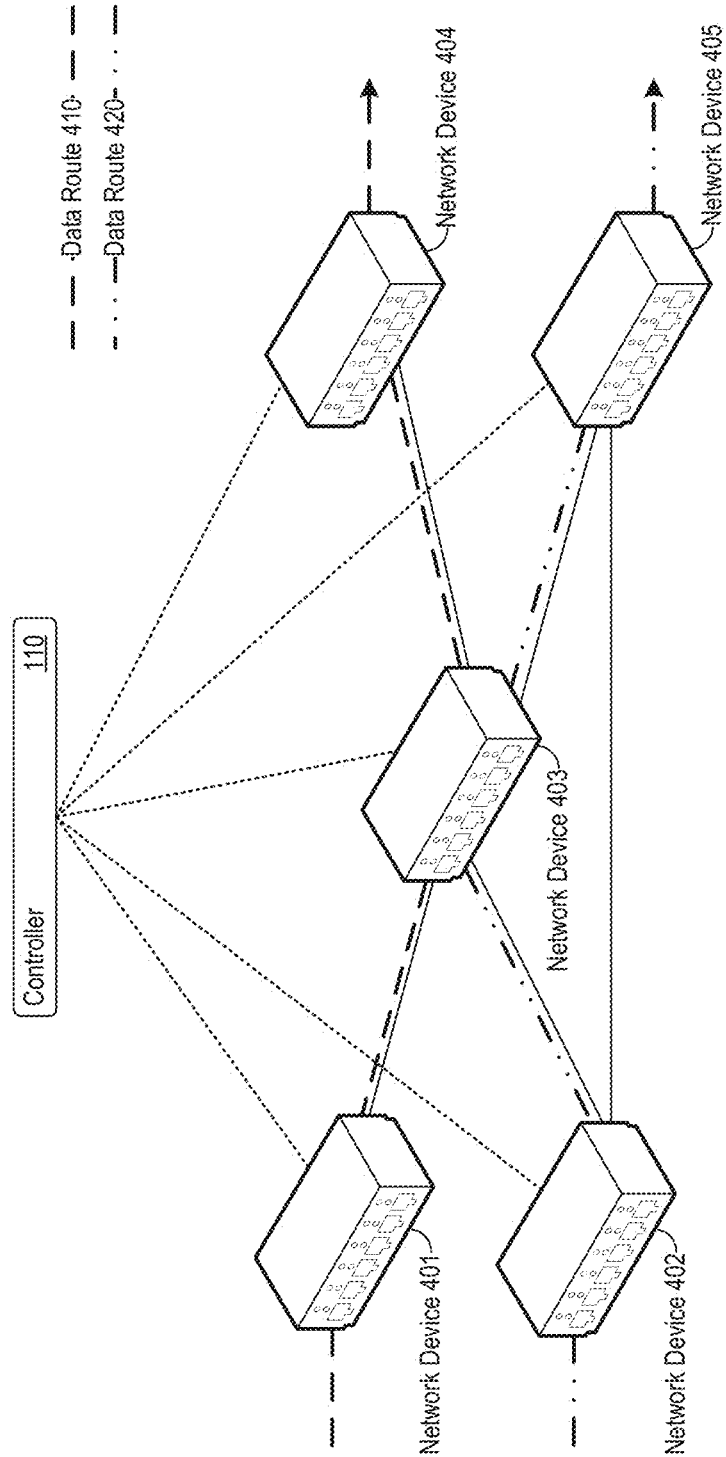
FIG. 4A shows an example of data routes in a communication network managed by the controller.

The controller 110 may selectively determine an altered data route through the controller 110 itself. Put another way, the controller 110 may at times determine the altered data route to include the controller 110 itself and at other times determine the altered data route to not include the controller itself 110. One such illustration is provided in FIGS. 4A and 4B. FIG. 4A shows an example of data routes 410 and 420 in a communication network managed by the controller 110. In FIG. 4A, the communication network managed by the controller 110 includes the network devices 401, 402, 403, 404, and 405. In the communication network in FIG. 4, the data route 410 traverses from the network device 401 to the network device 403 to the network device 404. The data route 420 traverses from the network device 402 to the network device 403 to the network device 405.

Figure 4B:
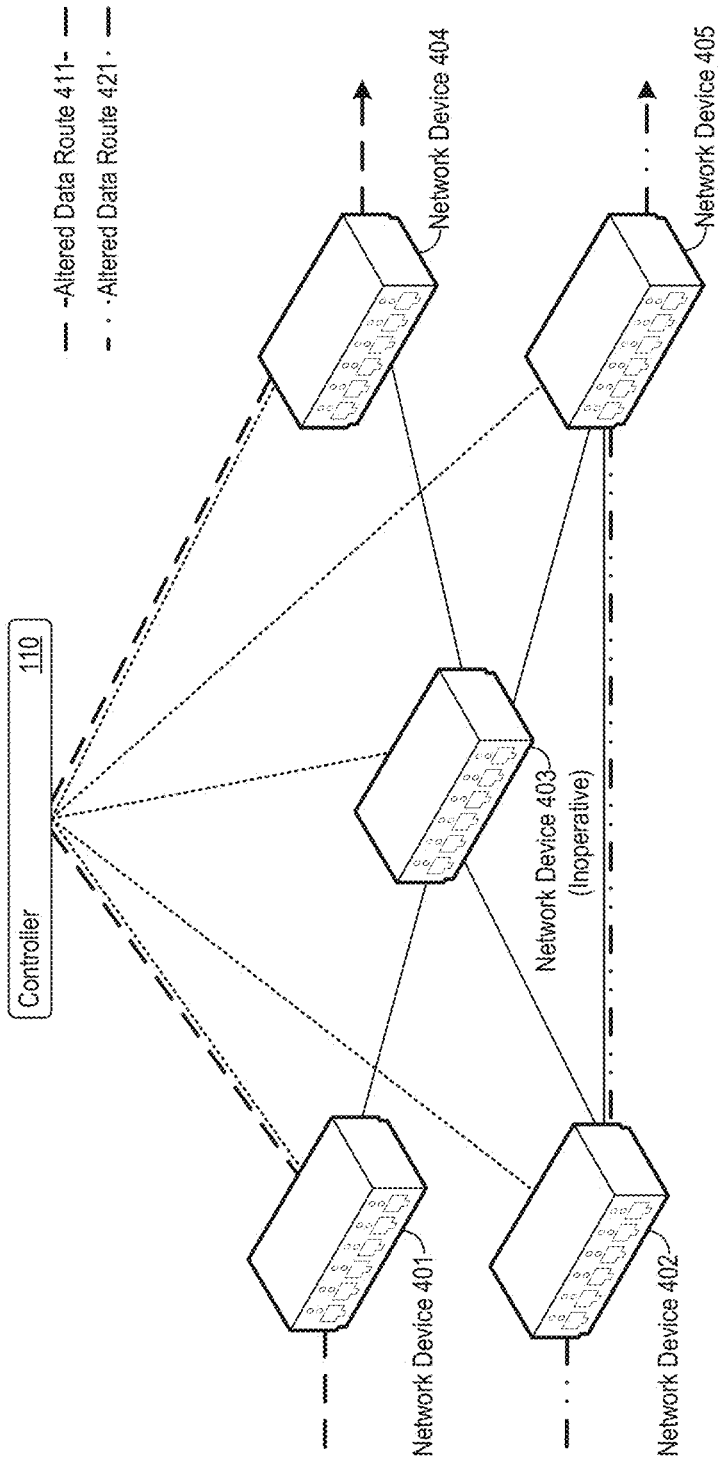
FIG. 4B shows an example of altered data routes that the controller may determine.

FIG. 4B shows an example of altered data routes 411 and 421 that the controller 110 may determine. In the example shown in FIG. 4B, the controller 110 determines the network device 403 as inoperative and identifies the data routes 410 as 420 as impacted data routes. The controller 110 may then determine altered data routes for the impacted data routes that may or may include the controller 110 itself.

The controller 110 may apply controller rerouting criteria in determining whether to reroute an impacted data route through the controller 110 itself or through another alternative data route in the communication network that does not include the controller 110. In one example, the controller 110 may itself replace an inoperative network device in an impacted data route when no alternative route is available in the communication network managed by the controller 110, which may serve as a controller rerouting criterion applied by the controller 110. As other examples, the controller rerouting criteria may include when alternative data routes in the communication network exceed a threshold flight time, threshold number of hops, a threshold processing bandwidth of a particular network device in the alternative data route, or a predetermined cost value (which may be measured in bandwidth consumption, flight time, number of hops, or according to any other network cost metric). As more examples, the controller rerouting criteria may include when the alternative data route cannot support a particular data type (e.g., supported by the inoperative network device) or cannot enforce a threshold level of security (e.g., cannot enforce a security policy or measure provided by the inoperative network device). The controller 110 may thus access a network topology, network statistics, device bandwidth or processing availability, traffic data, or any other data source to determine whether to reroute an impacted data route through itself or through another alternative data route in the communication network.

FIG. 4B provides example illustrations of how the controller 110 may determine altered data routes. In particular, the controller 110 in FIG. 4B determines to reroute an impacted data route through the controller 110 itself when no other alternative data routes for the impacted data route are present in the communication network. As seen in FIG. 4B, no alternative data routes are available in the communication network for routing data from the network device 401 to the network device 404 when the network device 403 is inoperative. Accordingly, the controller 110 determines to reroute the data route 410 into the altered data route 411, replacing the inoperative network device 403 with the controller 110 itself. For the data route 420, the controller 110 may identify an alternative data route from the network device 402 directly to the network device 405. Accordingly, the controller 110 determines to alter the data route 420 into the altered data route 421 from the network device 402 to the network device 405 instead of routing data for the data route 420 through the controller 110 itself. Of course, the controller 110 may identify additional operative network devices in the communication network to replace an inoperative network device as well, e.g., as part of an alternative data route for an impacted data route.

Figure 5A:
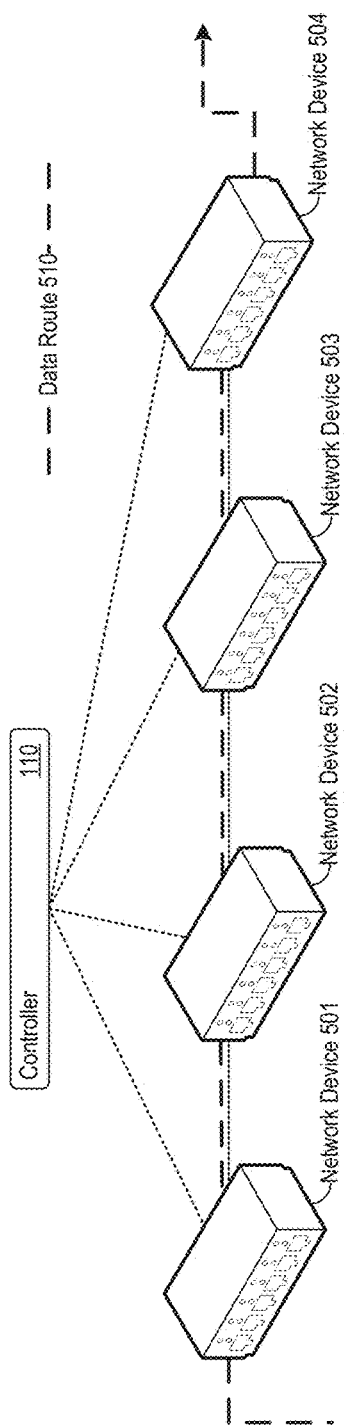
FIG. 5A shows an example of a data route in a communication network managed by the controller.
Figure 5B:
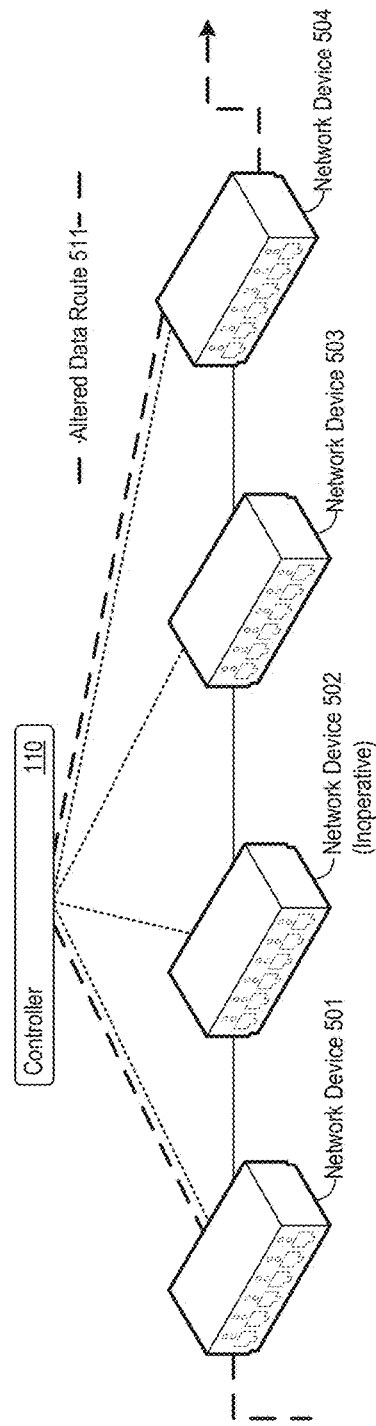
FIG. 5B shows an example of an altered data route that the controller may determine.

In determining an altered data route, the controller 110 may bypass one or more network devices in the data route aside from the inoperative network device. One such example is shown in FIGS. 5A and 5B. FIG. 5A shows an example of a data route 510 in a communication network managed by the controller 110. The managed communication network in FIG. 5A includes the network devices 501, 502, 503, and 504 serially linked as shown. The controller 110 in FIG. 5A configures the data route 510 in the communication network to traverse from the network device 501 to the network device 502, to the network device 503, and to the network device 504. The network device 504 may thus be referred to as an edge network device for the data route 510, as it is the last network device in the data route 510 in the communication network managed by the controller 110. Along similar lines, the network device 501 may also be referred to as an edge network device for the data route 510 as it is the first network device in the data route 510 in the managed communication network.

FIG. 5B shows an example of an altered data route 511 that the controller 110 may determine. In particular, the controller 110 may detect the network device 502 in FIG. 5B as inoperative and identify the data route 510 as an impacted data route. The controller 110 may bypass one or more network devices in the impacted data route 510 when determining an altered data route. In the example shown in FIG. 5B, the controller 110 replaces inoperative network device 502 with the controller 110 itself and further alters the data route 510 by bypassing the network device 503 in generating the altered data route 511. The controller 110 may thus bypass a network device even though the network device has not been detected as inoperative. Put another way, the controller 110 may determine the altered data route 511 to skip network devices in the impacted data route, which may reduce communication latency, improve network bandwidth, reduce device processing requirements, and generally improve the efficiency of the communication network.

The controller 110 thus alters the data route 510 by bypassing another network device in addition to the inoperative network device 502, specifically the network device 503 in FIG. 5B. As the controller 110 is aware of the network topology and the sequencing of the impacted data route 510, the controller 110 may alter the data route 510 to traverse directly from the controller 110 to a subsequent edge network device at the edge of the communication network for the impacted data route, though the controller 110 may determine an altered data path that traverses from the controller 110 to a subsequent non-edge device in the impacted data route as well.

Figure 6:
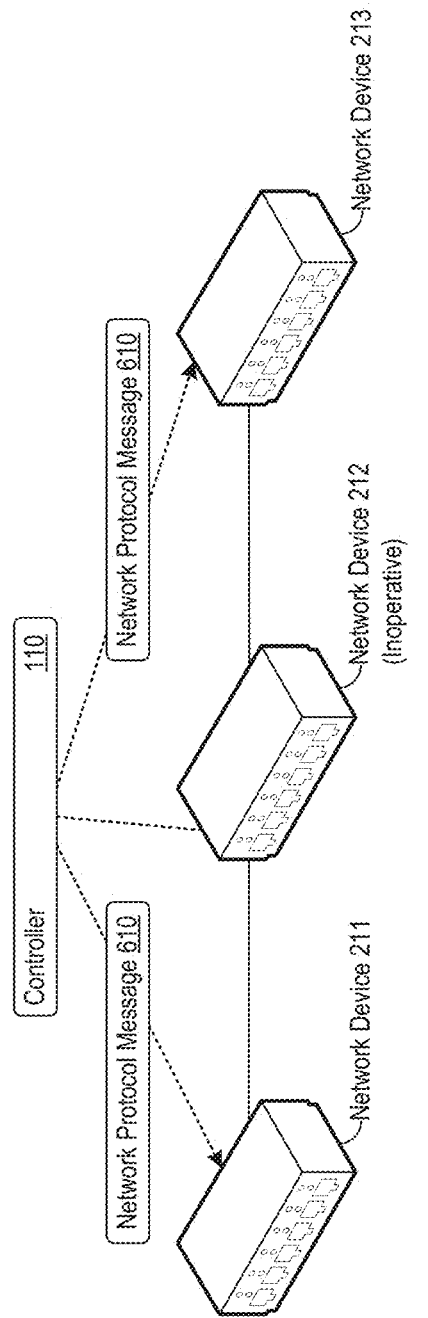
FIG. 6 shows an example of redundant network communications the controller may send.

Some of the examples above describe how the controller 110 may provide a redundant network switching operation for an inoperative network device. The controller 110 may additionally or alternatively provide other redundant functions for the inoperative network device. One such example is shown in FIG. 6, which shows an example of redundant network communications the controller 110 may send. In FIG. 6, the controller 110 manages a communication network that includes the network devices 211, 212, and 213 and detects the network device 212 as inoperative.

The controller 110 may mimic any network function provided by the inoperative network device 212. In that regard, the controller 110 may perform any network protocol communications performed by the network device 212 when operative. In FIG. 6, the controller 110 transmits network protocol messages 610 to the network devices 210 and 212 in place of the inoperative network device 212. The network protocol packets 610 communicated by the controller 110 may support spanning-tree, open shortest path first (OSPF), ping, virtual router redundancy protocol (VRRP), or any other network protocol utilized by the communication network. By sending network protocol packets 610 in place of the inoperative network device 212, the controller 110 may mask the disabling of the network device 212 to other managed network devices in the communication network, such as the network devices 210 and 212. By doing so, the controller 110 may prevent the other network devices 210 and 212 from route processing or recalculations that these network devices 210 and 212 may perform when another network device becomes inoperative.

In some examples, the controller 110 may mimic the inoperative network device 212 and generate network protocol messages 610 to other network devices in the managed communication network when the controller 110 determines that an inoperative time period when a particular network device will subsequently become inoperative, e.g., during a planned shutdown, reboot, system upgrade, etc. Thus, the controller 110 may send out network protocol messages 610 to other network devices in the network during or even before the inoperative time period of the particular network device. The controller 110 may, as another example, determine to mimic the inoperative network device 212 when the duration of the inoperative time period is less than a time threshold, e.g., to avoid longer network outages and costly path re-calculations by other network devices). The time threshold may be configured by the controller 110 or a network administrator.

The controller 110 may generate a network protocol message 610 using identifying information of an inoperative network device or mimic communication traffic from an inoperative network device 212. Along similar lines, the controller 110 may use an encoding process, communication protocol, or other communication techniques used by the inoperative network device 212 in order to generate a network protocol message 610. As one example in FIG. 6, the controller 110 may encode a network protocol message 610 to specify a port address, media access control (MAC) address, or any other address identifying information for the inoperative network device 212 instead of the controller 110. In that regard, the controller 110 may generate a network protocol message 610 sent to the network device 211 such that the network device 211 interprets the network protocol message as being sent from the inoperative network device 212 and not the controller 110. As another illustrative example, the controller 110 may generate the network protocol message 610 for the network device 211 using a data plane protocol message that the inoperative network device 212 send as opposed to a control plane protocol message the controller 110 would across a control plane connection.

Figure 7:
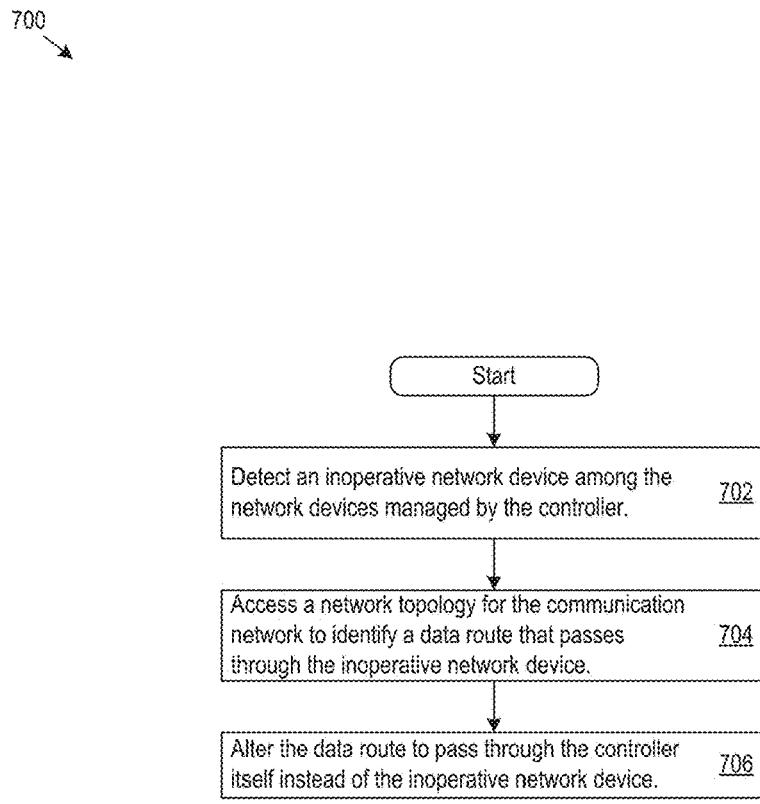
FIG. 7 shows an example of logic that the controller may implement to provide a redundant network operation.

FIG. 7 shows an example of logic 700 that the controller 110 may implement to provide a redundant network operation. The controller 110 may implement the logic 700 as hardware, software, or a combination of both, for example as a machine readable medium storing processor executable instructions.

The controller 110 may detect an inoperative network device among the network devices managed by the controller 110 (702). In response, the controller 110 may access a network topology for the communication network to identify a data route that passes through the inoperative network device (704) and alter the data route to pass through the controller 110 itself instead of the inoperative network device (706). While some example features of the controller 110 are shown in FIG. 7, the logic 700 may include any combination of the features of the controller 110 described herein.

In some examples, the controller 110 detects the inoperative network device for a subsequent scheduled time when a particular functioning network device will become inoperative. Accordingly, the controller 110 may preemptively alter a data route that will be impacted to include the controller 110 itself before the particular functioning network device becomes inoperative.

The controller 110 may cease to provide a redundant network function when an inoperative network device becomes operative. In that regard, the controller 110 may detect when the inoperative network device regains network functionality and becomes operative again. For example, the controller 110 may determine that a particular network device identified as inoperative has become operative when receiving polling or check-in messages from the particular network device, receiving link messages from the particular network device or other linked network devices, or through any other operative detection means. In ceasing to provide a redundant network function, the controller 110 may revert an altered data route when the inoperative network device regains network connectivity. The controller 110 may revert the altered data route to the original data route, for example, and replace the controller 110 in the altered data route with the inoperative network device that has regained network functionality. The controller 110 may thus provide a redundant network operation to the communication network when a particular network device becomes operative and return the communication network to a previous state when the particular network state regains network functionality.

In some examples, the controller 110 may detect an inoperative network device and determine an altered data route through a different control plane entity different from the controller 110. For example, the controller 110 may identify a different control plane device to replace the inoperative network device in the altered data route. The different control plane device may have access to a data plane network topology and may be capable of providing a redundant network function in place of the inoperative network device e.g., determining forwarding decisions on behalf of the inoperable network device. In some implementations, the controller 110 virtualizes the redundant network function to replace the inoperative network device, for example on a cloud system or other control plane system communicatively linked to the managed network devices of the communication network.

Figure 8:
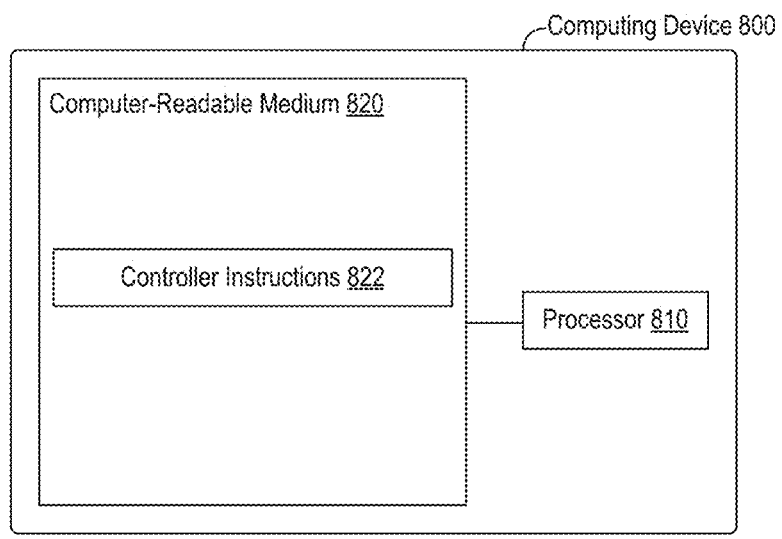
FIG. 8 shows an example of a computing device that may implement the controller.

FIG. 8 shows an example of a computing device 800 that supports accessing of structured data, unstructured data, or both. In that regard, the computing device 800 may implement any of the functionality described herein, including any functionality of the controller 110 described above. The computing device 800 may include a processor 810. The processor 810 may be one or more central processing units (CPUs), microprocessors, and/or any hardware device suitable for executing instructions stored on a computer-readable medium (e.g., a memory). The computing device 800 may include a computer-readable medium 820. The computer-readable medium 820 may be any electronic, magnetic, optical, or other physical storage device that stores executable instructions, such as the controller instructions 822 shown in FIG. 8. Thus, the computer-readable medium 820 may be, for example, Random Access Memory (RAM), an Electrically-Erasable Programmable Read-Only Memory (EEPROM), a storage drive, an optical disk, and the like.

The computing device 800 may execute instructions stored on the computer-readable medium 820 through the processor 810. Executing the instructions may cause the computing device 800 to perform any of the features described herein. One specific example is shown in FIG. 8 through the controller instructions 822. Executing the controller instructions 822 may cause the computing device 800 to perform any combination of the functionality of the described above for the controller 110, such as detect an inoperative network device in a communication network managed by a controller, determine a network switching function assigned to the inoperative network device, and provide the network switching function through the controller itself instead of the inoperative network device.

As described herein, a controller 110 may provide a redundant network operation to a communication network in place of an inoperative network device. By utilizing a network topology that the controller 110 may maintain, the controller 110 may preserve network connectivity for data routes impacted by the inoperative network device losing network functionality. By providing the redundant network operation through the controller 110 itself, the controller 110 may reduce or eliminate additional redundant hardware in the communication network, thus reducing costs and management complexity. Moreover, the controller 110 may provide such the redundancy benefits in a seamless and efficient manner, such as that end users, application servers, and/or other network devices may be unaware that a network device in the communication network has become inoperative. Depending on the bandwidth requirements of the communication network, the controller 110 may provide redundant network operations without performance degradation such that end users may be unaffected by the inoperative network device.

The methods, devices, systems, and logic described above, including the controller 110, may be implemented in many different ways in many different combinations of hardware, software or both hardware and software. For example, all or parts of the controller 110 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the circuitry, systems, devices, and logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the systems, devices, and circuitry described herein, including the controller 110, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments have been described, it will be apparent to those of ordinary skill in the art that many more embodiments and implementations are possible.

Some example implementations have been described. Additional or alternative implementations are possible.

The invention claimed is:

1. A method comprising:
through a controller that manages network devices in a communication network:
detecting an inoperative network device among the network devices managed by the controller, and in response:
accessing a network topology for the communication network to identify a data route that passes through the inoperative network device; and
altering the data route to pass through the controller itself instead of the inoperative network device, wherein altering the data route comprises:
identifying a particular network device adjacent to the inoperative network device on the data route; and
configuring the particular network device to transmit packet data for the data route to the controller instead of the inoperative network device, wherein configuring the particular network device comprises instructing the particular network device to transmit the packet data for the data route through a control plane connection with the controller.

2. The method of claim 1, wherein configuring the particular network device comprises sending a configuration instruction to the particular network device to alter a next hop destination for the data route to the controller instead of the inoperative network device.

3. The method of claim 1, wherein detecting the inoperative network device comprises any combination of:
receiving a link lost message from another network device communicatively coupled to the inoperative network device; and
determining the inoperative network device has not transmitted a response to a polling message within a response time limit.

4. The method of claim 1, further comprising:
sending a network protocol message to other network devices in place of the inoperative network device.

5. The method of claim 1, wherein altering the data route further comprises bypassing a network device in the data route different from the inoperative network device.

6. A system comprising:
a controller to:
detect an inoperative network device in a communication network managed by the controller, and in response:
access a network topology to identify a data route that includes the inoperative network device;
determine an altered data route by replacing the inoperative network device in the data route with the controller itself; and
implement the altered data route by instructing an adjacent network device previous to the inoperative network device in the data route to transmit data for the data route to the controller instead of the inoperative network device, wherein the controller is to instruct the adjacent network device further to transmit packet data for the altered data route through a control plane connection with the controller.

7. The system of claim 6, wherein the controller is to detect the inoperative network device by determining at least one of the following inoperative device criterion are satisfied:

receiving a link lost message from another network device communicatively coupled to the inoperative network device; and determining the inoperative network device has not transmitted a response to a polling message within a response time limit.

8. The system of claim 6, wherein the controller is to determine the altered data route to bypass a network device in the data route different from the inoperative network device.

9. A product comprising:
a non-transitory computer-readable medium storing executable instructions to:
  detect an inoperative network device in a communication network managed by a controller, and in response:
    determine a network switching function assigned to the inoperative network device, wherein the network switching function comprises routing data in a data route that passes through the inoperative network device;
    provide the network switching function through the controller itself by determining an altered data route that passes through the controller instead of the inoperative network device; and
    instruct an adjacent network device previous to the inoperative network device in the data route to transmit packet data for the altered data route through a control plane connection with the controller.

10. The product of claim 9, wherein the altered data route comprises a communication link across a data plane as well as a communication link across a control plane.

11. A product comprising:
a non-transitory computer-readable medium storing executable instructions to:
  detect an inoperative network device in a communication network managed by a controller, and in response:
    determine a network switching function assigned to the inoperative network device, wherein the network switching function comprises routing data in
  a data route that passes through the inoperative network device; provide the network switching function through the controller itself by determining an altered data route that passes through the controller instead of the inoperative network device, wherein the altered data route comprises a communication link across a data plane as well as a communication link across a control plane.

* * * * *